(12) United States Patent
Marchand et al.

(10) Patent No.: US 9,534,638 B2
(45) Date of Patent: Jan. 3, 2017

(54) RETENTION MEANS FOR A SEAL BOOT USED IN A UNIVERSAL JOINT IN A DOWNHOLE MOTOR DRIVESHAFT ASSEMBLY

(75) Inventors: Nicholas Ryan Marchand, Edmonton (CA); Jeremy Scott Clements, Edmonton (CA); Steven Edward Hackman, Edmonton (CA); Tyler Jarret Dyck, Edmonton (CA)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 1211 days.

(21) Appl. No.: 12/831,457

(22) Filed: Jul. 7, 2010

(65) Prior Publication Data

US 2011/0005839 A1    Jan. 13, 2011

Related U.S. Application Data

(60) Provisional application No. 61/223,577, filed on Jul. 7, 2009.

(51) Int. Cl.
| | |
|---|---|
| *E21B 4/00* | (2006.01) |
| *E21B 4/02* | (2006.01) |
| *F16D 3/20* | (2006.01) |
| *F16D 3/84* | (2006.01) |

(52) U.S. Cl.
CPC ............. *F16D 3/845* (2013.01); *E21B 4/003* (2013.01); *E21B 4/02* (2013.01); *F16D 3/20* (2013.01); *Y10T 29/49826* (2015.01)

(58) Field of Classification Search
CPC ............. F16D 3/845; F16D 3/20; F16D 7/05; F16D 7/00; E21B 4/003; E21B 4/02; E21B 4/14; E21B 21/12; E21B 4/06; Y10T 29/49826; B63H 16/20; B63H 2023/344; B63H 20/22; B63H 20/12; F16H 1/166; F16H 55/10; F16H 55/12; F16J 15/52; F16C 11/0671; F16K 41/10
USPC ............ 175/92; 440/28, 57; 74/464; 403/50; 464/23, 155, 18, 156, 19; 277/635; 439/346; 285/318
See application file for complete search history.

(56) References Cited

U.S. PATENT DOCUMENTS

| | | | | |
|---|---|---|---|---|
| 2,255,172 | A | * | 9/1941 | Johnson .................. 464/113 |
| 3,999,618 | A | * | 12/1976 | Farris ........................ 175/92 |
| 4,369,979 | A | * | 1/1983 | Krude et al. ............. 464/175 |
| 4,747,805 | A | * | 5/1988 | Welschof et al. ........ 464/175 |
| 4,772,246 | A | * | 9/1988 | Wenzel .................... 464/117 |

(Continued)

*Primary Examiner* — Shane Bomar
*Assistant Examiner* — Wei Wang
(74) *Attorney, Agent, or Firm* — Conley Rose, P.C.

(57) ABSTRACT

A driveshaft assembly for a downhole motor comprises a housing and a driveshaft rotatably disposed within the housing. The driveshaft has a central axis and a first end. Further, the driveshaft assembly comprises a driveshaft adapter having a first end coupled to the first end of the driveshaft with a universal joint. The first end of the driveshaft adapter includes a counterbore. The first end of the driveshaft and the universal joint are disposed in the counterbore. Still further, the driveshaft assembly comprises an end cap disposed about the driveshaft and coaxially coupled to the adapter. Moreover, the driveshaft assembly comprises a seal boot disposed about the driveshaft and adapted to restrict fluid flow through a annular gap positioned between the driveshaft and the end cap. The driveshaft assembly also comprises a locking assembly adapted to restrict the end cap from moving axially relative to the adapter.

25 Claims, 11 Drawing Sheets

(56) References Cited

U.S. PATENT DOCUMENTS

| | | | |
|---|---|---|---|
| 4,904,228 A * | 2/1990 | Frear et al. | 464/152 |
| 5,000,723 A * | 3/1991 | Livingstone | 464/140 |
| 5,082,390 A * | 1/1992 | Balsells | 403/326 |
| 5,092,821 A * | 3/1992 | Gilbert et al. | 464/152 |
| 5,222,746 A * | 6/1993 | Van Steenbrugge | 277/630 |
| 5,267,905 A * | 12/1993 | Wenzel et al. | 464/140 |
| 5,588,818 A * | 12/1996 | Houmand et al. | 418/5 |
| 5,704,838 A * | 1/1998 | Teale | 464/19 |
| 6,561,290 B2 * | 5/2003 | Blair et al. | 175/107 |
| 6,949,025 B1 * | 9/2005 | Kraus et al. | 464/19 |
| 7,186,182 B2 * | 3/2007 | Wenzel et al. | 464/19 |
| 7,198,642 B2 * | 4/2007 | Hazebrouck et al. | 623/16.11 |
| 7,357,725 B2 * | 4/2008 | Sueoka et al. | 464/175 |
| 7,624,819 B1 * | 12/2009 | LeBlanc et al. | 175/57 |
| 8,033,917 B2 * | 10/2011 | Prill et al. | 464/18 |
| 8,167,285 B2 * | 5/2012 | Balsells | 267/166 |
| 2003/0094812 A1 * | 5/2003 | Balsells | 285/318 |
| 2003/0096526 A1 * | 5/2003 | Balsells | 439/346 |
| 2003/0157846 A1 * | 8/2003 | Poon et al. | 439/840 |
| 2003/0204262 A1 * | 10/2003 | Ferguson et al. | 623/20.15 |
| 2003/0223806 A1 * | 12/2003 | De Freitas | 403/122 |
| 2004/0245686 A1 * | 12/2004 | Balsells | 267/1.5 |
| 2005/0026706 A1 * | 2/2005 | Kashiwagi et al. | 464/175 |
| 2006/0133888 A1 * | 6/2006 | Sueoka et al. | 403/50 |
| 2009/0149053 A1 * | 6/2009 | Chansrivong | 439/349 |
| 2009/0160139 A1 * | 6/2009 | Balsells | 279/142 |
| 2009/0185853 A1 * | 7/2009 | Koelling et al. | 403/229 |
| 2009/0199375 A1 * | 8/2009 | Koelling et al. | 24/700 |
| 2009/0236938 A1 * | 9/2009 | Bromfield | 310/323.19 |
| 2009/0258519 A1 * | 10/2009 | Dilmaghanian et al. | 439/271 |
| 2009/0289418 A1 * | 11/2009 | Cook | 277/309 |
| 2010/0012908 A1 * | 1/2010 | Sjostedt | 254/266 |
| 2010/0028076 A1 * | 2/2010 | Balsells | 403/326 |
| 2010/0029145 A1 * | 2/2010 | Balsells et al. | 439/827 |
| 2010/0090379 A1 * | 4/2010 | Balsells | 267/1.5 |
| 2010/0120546 A1 * | 5/2010 | Suzuki et al. | 464/145 |
| 2010/0199493 A1 * | 8/2010 | Chansrivong | 29/869 |
| 2010/0289198 A1 * | 11/2010 | Balsells et al. | 267/151 |
| 2012/0134742 A1 * | 5/2012 | Changsrivong et al. | 403/328 |
| 2012/0195542 A1 * | 8/2012 | Marchand | 384/606 |
| 2012/0213575 A1 * | 8/2012 | Balsells | 403/321 |

* cited by examiner

RETENTION MEANS FOR A SEAL BOOT USED IN A UNIVERSAL JOINT IN A DOWNHOLE MOTOR DRIVESHAFT ASSEMBLY

CROSS-REFERENCE TO RELATED APPLICATIONS

This application claims benefit of U.S. provisional application Ser. No. 61/223,577 filed Jul. 7, 2009, and entitled "Retention Means for a Seal Boot Used in a Universal Joint in a Downhole Motor Driveshaft Assembly," which is hereby incorporated herein by reference in its entirety.

STATEMENT REGARDING FEDERALLY SPONSORED RESEARCH OR DEVELOPMENT

Not applicable.

BACKGROUND

Field of the Invention

The invention relates generally to downhole motors used for drilling oil and gas wells. More particularly, invention relates to means for retaining a seal boot on a universal joint housing for a driveshaft of a downhole motor.

Background of the Technology

In drilling a borehole (or wellbore) into the earth, such as for the recovery of hydrocarbons or minerals from a subsurface formation, it is conventional practice to connect a drill bit onto the lower end of a "drill string", then rotate the drill string so that the drill bit progresses downward into the earth to create the desired borehole. A typical drill string is made up from an assembly of drill pipe sections connected end-to-end, plus a "bottom hole assembly" (BHA) disposed between the lower end of the drillstring and the drill bit. The BHA is typically made up of sub-components such as drill collars, stabilizers, reamers and/or other drilling tools and accessories, selected to suit the particular requirements of the well being drilled.

In borehole drilling operations, the drill string and bit are rotated by means of either a "rotary table" or a "top drive" associated with a drilling rig erected at the ground surface over the borehole (or in offshore drilling operations, on a seabed-supported drilling platform or suitably-adapted floating vessel). During the drilling process, a drilling fluid, commonly referred to as "drilling mud," "drilling fluid," or simply "mud", is pumped under pressure downward from the surface through the drill string, out nozzles in the face of the drill bit into the wellbore, and then upward back to the surface through the annulus between the drill string and the wellbore. The drilling fluid carries borehole cuttings to the surface, cools the drill bit, and forms a protective cake on the borehole wall to help stabilize and seal the borehole wall, as well as other beneficial functions. At surface the drilling fluid is treated, by removing borehole cuttings, amongst other possible treatments, then re-circulated by pumping it back downhole under pressure through the drill string.

As an alternative to rotation by a rotary table or top drive alone, a drill bit can also be rotated using a "downhole motor" incorporated into the drill string immediately above the drill bit. The technique of drilling by rotating the drill bit with a downhole motor without rotating the drill string is commonly referred to as "slide" drilling. It is common in certain types of well-drilling operations to use both slide drilling and drill string rotation, at different stages of the operation. The use of downhole motors has generally increased in recent years due, at least in part, to their employment in the drilling of wellbores directionally, since downhole motors provide some advantages in such applications.

The downhole motor, which may also be referred to as a mud motor or progressive displacement motor (PDM), converts hydraulic energy of a fluid such as drilling mud into mechanical energy in the form of rotational speed and torque output, which may be harnessed for a variety of applications such as downhole drilling. A typical downhole motor includes a hydraulic drive section, a drive shaft assembly, and a bearing assembly. The hydraulic drive section, also known as a power section or rotor-stator assembly, includes a helical rotor rotatably disposed within a stator, the driveshaft assembly includes a driveshaft rotatably disposed within a driveshaft housing, and the bearing assembly includes a mandrel rotatably supported within a housing. The lower end of the rotor is connected to the upper end of the driveshaft, the lower end of the driveshaft is connected to the upper end of the mandrel, and the lower end of the mandrel is coupled to a drill bit. During drilling operations, the high pressure drilling fluid is pumped under pressure down the drillstring and between the rotor and stator, causing the rotor to rotate relative to the stator. Rotation of the rotor drives the rotation of the driveshaft, the mandrel, and the drill bit.

The driveshaft assembly generally functions to transfer torque from the eccentrically-rotating rotor to the concentrically-rotating bearing assembly mandrel and drill bit. The motor may also be configured such that the longitudinal axis of the power section is skewed or oriented at an acute angle relative to the longitudinal axis of the bearing section and drill bit. The driveshaft of the driveshaft assembly typically includes universal joints at its upper and lower ends to accommodate the misalignment of axes during operation while allowing transfer of torque from the power section to the bearing assembly and drill bit. The universal joints are usually axially received within upper and lower adapters. The upper adapter connects to the rotor of the power section, and the lower adapter connects to the mandrel of the bearing assembly. A threaded end cap or sleeve is typically employed at each universal joint to retain an elastomeric seal boot that encases and seals the components of the universal joint from drilling mud, and maintains the position of the universal joints and driveshaft ends within the driveshaft adapters.

During downhole operations, it is critical that the end caps remain threadably secured to the adapters. Specifically, if an end cap loosens and disengages from an adapter, (a) the components of the universal joint may separate from the adapter, potentially disabling the ability to transfer torque from the power section to the drill bit, and further, (b) the seal boot will cease to function and components of the universal joint will become undesirably exposed to the drilling fluid, potentially leading to universal joint failure.

In most conventional driveshaft assemblies, application of a thread-locking compound to the mating threads of the end caps and adaptors, followed by the application of makeup torque to the threaded end caps is employed to prevent unthreading and loosening of the end caps from the adapters. Due to the relatively short axial length of typical end caps, the typical means to apply the necessary makeup torque is through the use of a pipe wrench connected to an overhead crane with a load cell that measures the torque applied to the end cap as the connection is made up. This approach occasionally fails, and further, introduces safety hazards and difficulties during servicing. For example, the pipe wrench is susceptible to fracturing under the excessive torque loads required in some cases, potentially causing pieces of the pipe wrench to be dangerously projected across the shop floor at high velocities. Moreover, the pinching loads applied to the end caps as the pipe wrench bites into the cap may overstress and/or deform the cap. Thread-locking compound also increases the difficulty in servicing the driveshaft assembly, particularly during disassembly, where the end cap-adapter threaded connection must first be heated to liquefy the hardened thread-locking compound to permit subsequent unthreading of the end cap and the adapter. Still further, even with the use of thread-locking compound, high vibrations and harsh downhole conditions can occasionally lead to unthreading of the caps and adapters.

Accordingly, there remains a need in the art for devices, systems, and methods for securing an end cap to a driveshaft assembly adapter. Such devices, systems, and methods would be particularly well received if they restricted and/or prevented disengagement of the end cap and the adapter during downhole operations, maintained the position of the protective seal boot, and were relatively cheap and simple to employ.

BRIEF SUMMARY OF THE DISCLOSURE

These and other needs in the art are addressed in one embodiment by a driveshaft assembly for a downhole motor. In an embodiment, the driveshaft assembly comprises a housing and a driveshaft rotatably disposed within the housing. The driveshaft having a central axis, a first end, and a second end. Further, the driveshaft assembly comprises a driveshaft adapter having a first end coupled to the first end of the driveshaft with a universal joint. The first end of the driveshaft adapter includes a counterbore. The first end of the driveshaft and the universal joint are disposed in the counterbore. Still further, the driveshaft assembly comprises an end cap disposed about the driveshaft and coaxially coupled to the adapter. Moreover, the driveshaft assembly comprises an annular gap radially positioned between the driveshaft and the end cap. The driveshaft assembly also comprises a seal boot disposed about the driveshaft and adapted to restrict fluid flow through the annular gap. The seal boot has a first end secured to the driveshaft and a second end secured to the end cap. Further, the driveshaft assembly comprises a locking assembly positioned between the end cap and the adapter and including a retention member that engages the end cap and the adapter. The locking assembly is adapted to restrict the end cap from moving axially relative to the adapter These and other needs in the art are addressed in another embodiment by a method for assembling a driveshaft assembly for a downhole motor. In an embodiment, the method comprises (a) pivotally coupling an end of a driveshaft to a driveshaft adapter with a universal joint. The driveshaft adapter has a first end including a counterbore, and the end of the driveshaft and the universal joint are disposed in the counterbore. In addition, the method comprises (b) disposing an end cap about the driveshaft and threadably coupling the end cap to the adapter. Further, the method comprises (c) securing a first end of a seal boot to a first end of the end cap. Still further, the method comprises (d) securing a second end of the seal boot to the driveshaft. Moreover, the method comprises (e) restricting the end cap from moving axially relative to the adapter with a locking assembly by positioning an end cap retention member at least partially in a first recess formed in a surface of the end cap and at least partially in a second recess formed in a surface of the adapter.

These and other needs in the art are addressed in another embodiment by a downhole motor. In an embodiment, the downhole motor comprises a power section including a stator and a rotor rotatably disposed in the stator. In addition, the downhole motor comprises a driveshaft assembly including a housing and a driveshaft rotatably disposed in the housing. The housing has an upper end coupled to the stator. The driveshaft is pivotally coupled to the rotor with a driveshaft adapter and a universal joint. A first end of the driveshaft and the universal joint are disposed in a counterbore formed in an end of the driveshaft adapter. The driveshaft assembly further comprises an end cap disposed about the driveshaft, the end cap having a first end coaxially coupled to the adapter. Further, the downhole motor comprises a locking assembly adapted to restrict the end cap from moving axially relative to the adapter. The locking assembly includes a first recess formed in a surface of the end cap, a second recess formed in a surface of the adapter, and a retention member at least partially disposed in the first recess and at least partially disposed in the second recess.

Thus, embodiments described herein comprise a combination of features and advantages intended to address various shortcomings associated with certain prior devices, systems, and methods. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
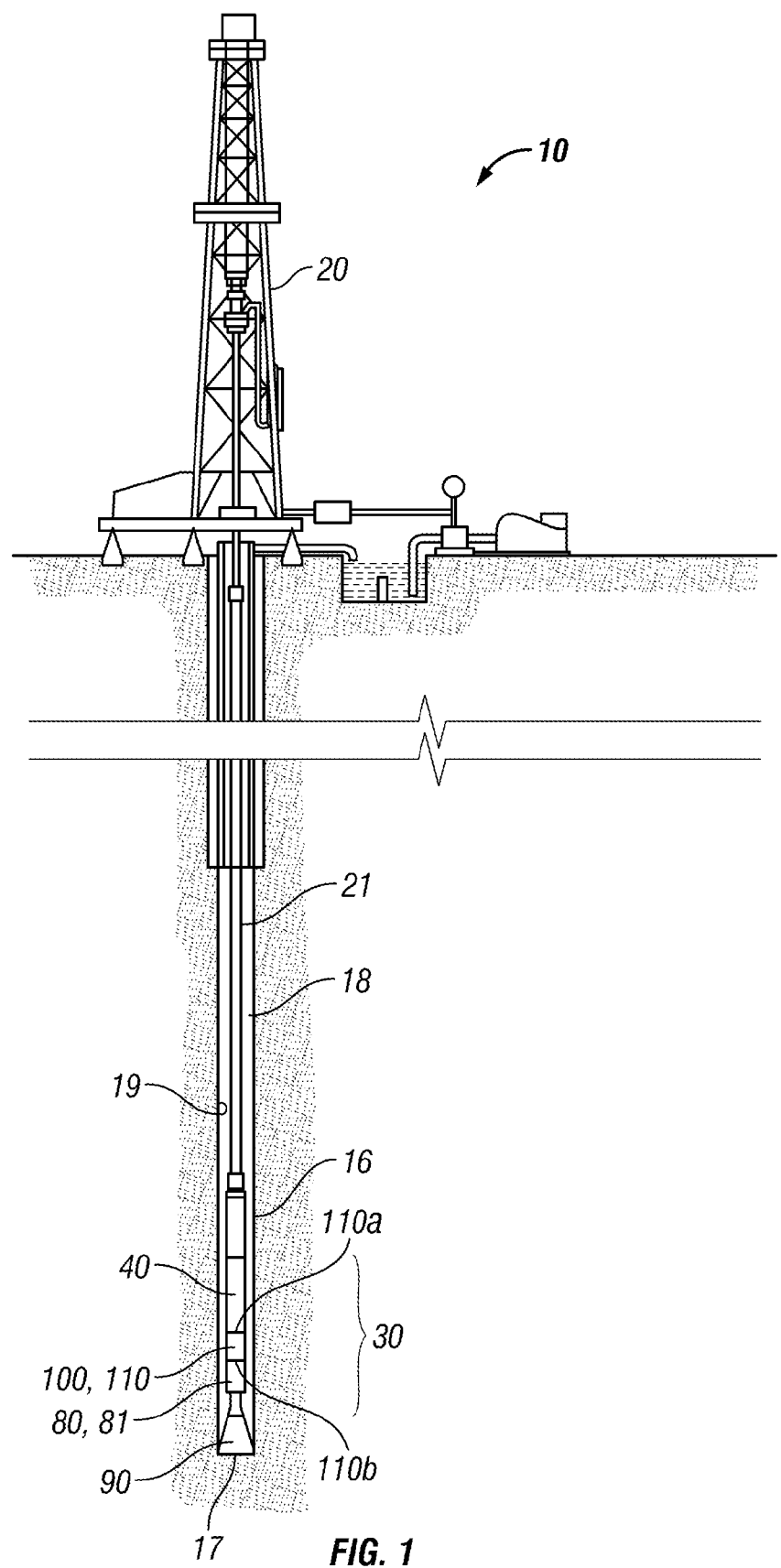
FIG. 1 is a schematic view of an embodiment of a drilling system including an embodiment of a driveshaft assembly in accordance with the principles described herein.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, a downhole drilling system 10 comprises a rig 20, a drill string 21, and a downhole motor 30 coupled to a drill bit 90. Motor 30 forms part of the bottomhole assembly (BHA) and is disposed between the lower end of the drill string 21 and the drill bit 90. In this embodiment, motor 30 includes hydraulic drive or power section 40, a driveshaft assembly 100, and a bearing assembly 80 coupled to drill bit 90.

The hydraulic drive section 40 converts drilling fluid pressure pumped down the drill string 21 into rotational energy at the drill bit 90. With force or weight applied to the drill bit 90 via the drill string 21 and/or motor 30, also referred to as weight-on-bit (WOB), the rotating drill bit 90 engages the earthen formation and proceeds to form a borehole 16 along a predetermined path toward a target zone. The drilling fluid or mud pumped down the drill string 21 and through the motor 30 passes out of the drill bit 90 through nozzles positioned in the bit face. The drilling fluid cools the bit 90 and flushes cuttings away from the face of bit 90. The drilling fluid and cuttings are forced from the bottom 17 of the borehole 16 to the surface through an annulus 18 formed between the drill string 21 and the borehole sidewall 19.

Figure 2:
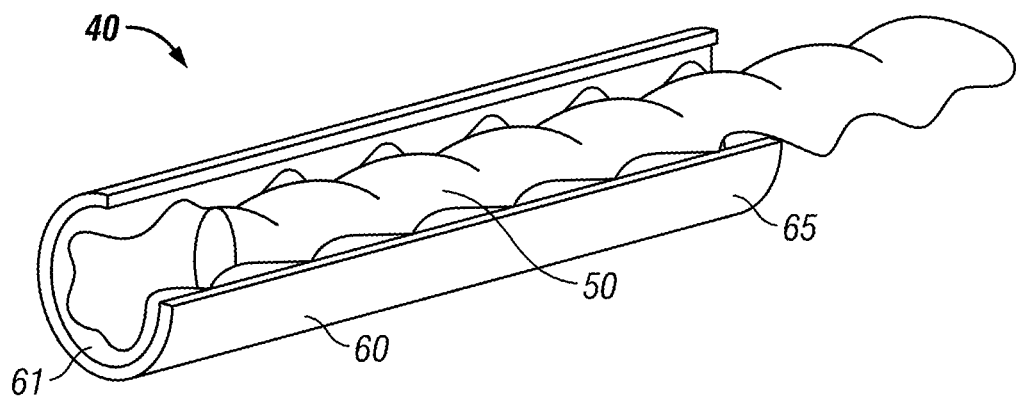
FIG. 2 is a perspective, partial cut-away view of the hydraulic drive section of FIG. 1.
Figure 3:
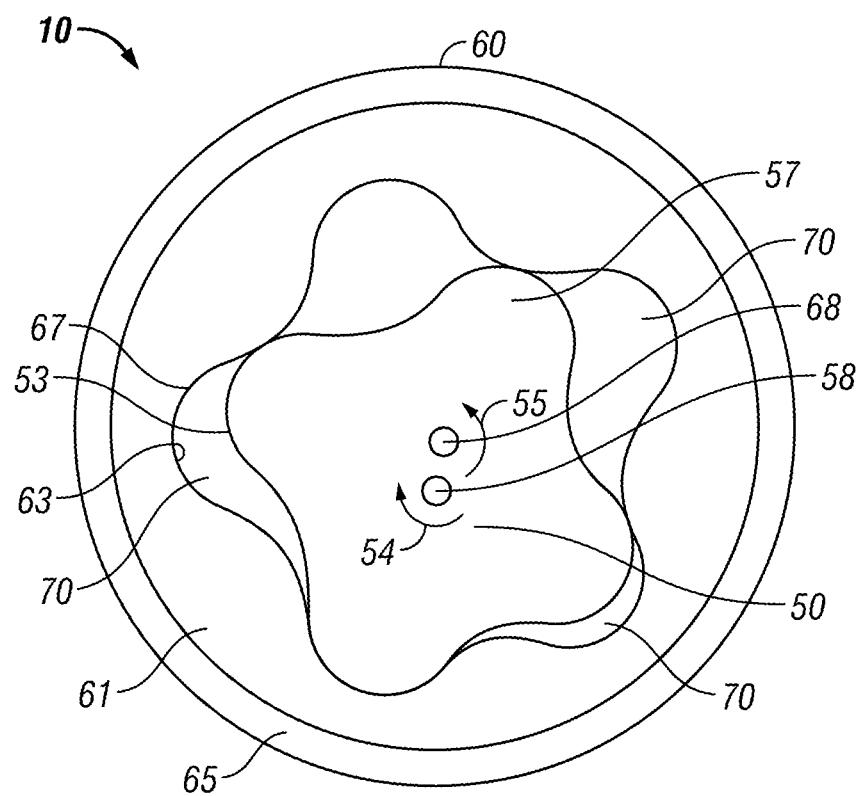
FIG. 3 is a cross-sectional end view of the hydraulic drive section of FIG. 1.

Referring now to FIGS. 2 and 3, hydraulic drive section 40 comprises a helical-shaped rotor 50, preferably made of steel that may be chrome-plated or coated for wear and corrosion resistance, disposed within a stator 60 comprising a cylindrical stator housing 65 lined with a helical-shaped elastomeric insert 61. The helical-shaped rotor 50 defines a set of rotor lobes 57 that intermesh with a set of stator lobes 67 defined by the helical-shaped insert 61. As best shown in FIG. 3, the rotor 50 has one fewer lobe 57 than the stator 60. When the rotor 50 and the stator 60 are assembled, a series of cavities 70 are formed between the outer surface 53 of the rotor 50 and the inner surface 63 of the stator 60. Each cavity 70 is sealed from adjacent cavities 70 by seals formed along the contact lines between the rotor 50 and the stator 60. The central axis 58 of the rotor 50 is radially offset from the central axis 68 of the stator 60 by a fixed value known as the "eccentricity" of the rotor-stator assembly. Consequently, rotor 50 may be described as rotating eccentrically within stator 60.

During operation of the hydraulic drive section 40, fluid is pumped under pressure into one end of the hydraulic drive section 40 where it fills a first set of open cavities 70. A pressure differential across the adjacent cavities 70 forces the rotor 50 to rotate relative to the stator 60. As the rotor 50 rotates inside the stator 60, adjacent cavities 70 are opened and filled with fluid. As this rotation and filling process repeats in a continuous manner, the fluid flows progressively down the length of hydraulic drive section 40 and continues to drive the rotation of the rotor 50. Driveshaft assembly 100 shown in FIG. 1 includes a driveshaft discussed in more detail below that has an upper end coupled to the lower end of rotor 50. The rotational motion and torque of rotor 50 is transferred to drill bit 90 via driveshaft assembly 100 and bearing assembly 80.

Figure 4:
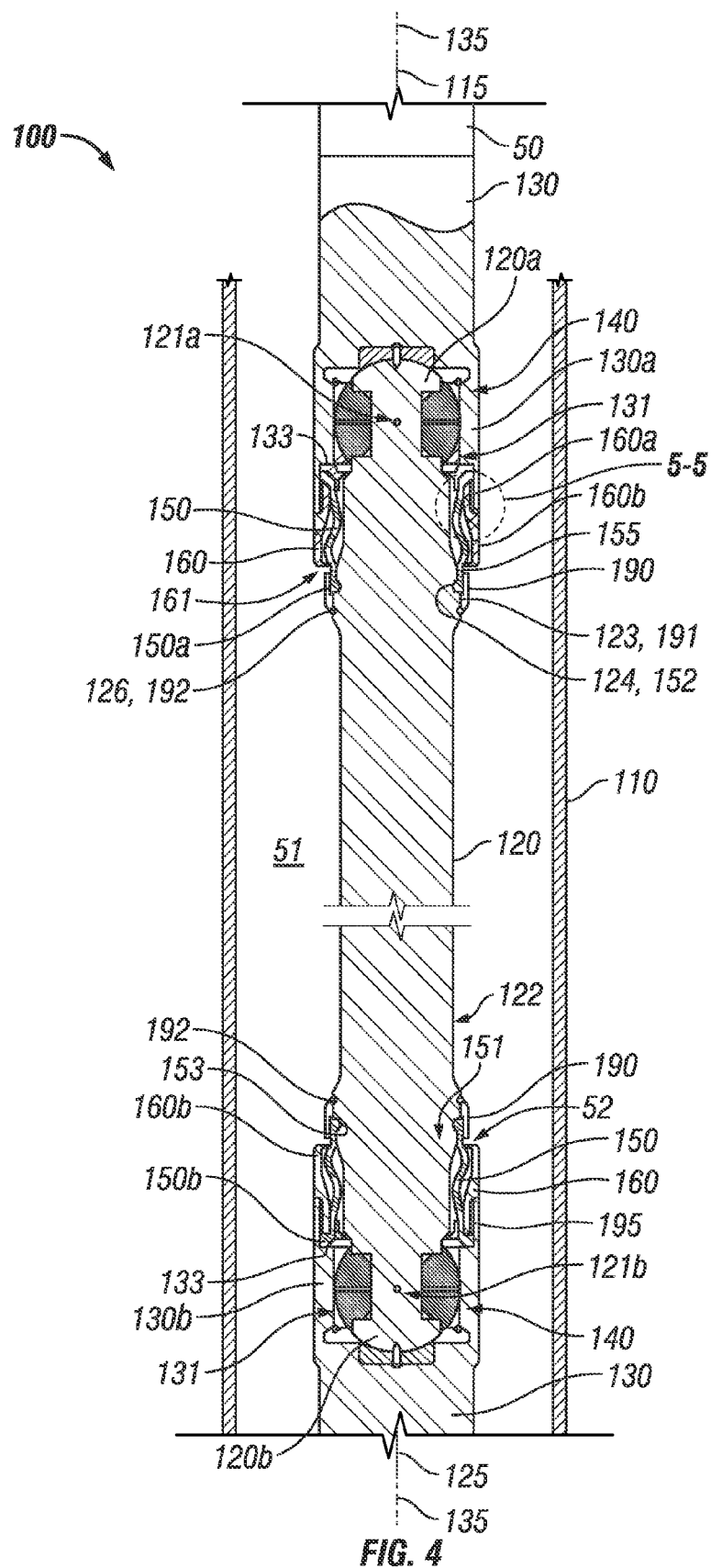
FIG. 4 is a partial cross-sectional view of the driveshaft assembly of FIG. 1.

Referring now to FIG. 4, an enlarged partial cross-sectional view of driveshaft assembly 100 of FIG. 1 is shown. In general, driveshaft assembly 100 functions to transfer torque from the eccentrically-rotating rotor 50 of power section 40 to the concentrically-rotating mandrel of bearing assembly 80 and drill bit 90. As best shown in FIG. 3, rotor 50 rotates about rotor axis 58 in the direction of arrow 54, and rotor axis 58 rotates about stator axis 68 in the direction of arrow 55. However, drill bit 90 and the mandrel of bearing assembly 80 are coaxially aligned and rotate about a common axis that is offset and/or oriented at an acute angle relative to rotor axis 58. Thus, driveshaft assembly 100 converts the eccentric rotation of rotor 50 to the concentric rotation of the bearing assembly mandrel and drill bit 90, which are radially offset and/or angularly skewed relative to rotor axis 58.

Driveshaft assembly 100 includes an outer housing 110, a driveshaft 120 rotatably disposed within housing 110, and a driveshaft adapter 130 coupled to each end of driveshaft 130. Adapters 130 connect driveshaft 120 to rotor 50 and the mandrel of bearing assembly 80. During drilling operations, high pressure drilling fluid or mud is pumped under pressure down drillstring 21 and through cavities 70 between rotor 50 and stator 60, causing rotor 50 to rotate relative to stator 60. Rotation of rotor 50 drives the rotation of adapters 130, driveshaft 120, the bearing assembly mandrel, and drill bit 90. The drilling fluid flowing down drillstring 21 through power section 40 also flows through driveshaft assembly 100 and bearing assembly 80 to drill bit 90, where the drilling fluid flows through nozzles in the face of bit 90 into annulus 18. Within driveshaft assembly 100, the drilling fluid flows through an annulus 51 formed between housing 110 and driveshaft 120.

As shown in FIGS. 1 and 4, housing 110 has a central or longitudinal axis 115, an upper end 110a coupled end-to-end with the lower end of stator housing 65, and a lower end 110b coupled end-to-end with the upper end of bearing assembly housing 81. As best shown in FIG. 1, in this embodiment, driveshaft housing 110 is coaxially aligned with stator housing 65 and bearing assembly housing 81. However, in other embodiments, such as those employed in directional drilling applications, the central axis of the power section stator (e.g., stator axis 68) may be oriented at an offset and/or acute angle relative to the central axis of the bearing assembly (e.g., bearing assembly 80) and drill bit (e.g., drill bit 90). For example, the driveshaft housing may be a bent housing including an upper section oriented at an acute angle relative to a lower section.

Referring again to FIG. 4, driveshaft 120 has a central or longitudinal axis 125, an upper end 120a coupled to the lower end of rotor 50 with one driveshaft adapter 130, and a lower end 120b coupled to the upper end of the bearing assembly mandrel with the other driveshaft adapter 130. As will be described in more detail below, each end 120a, b of driveshaft 120 is pivotally coupled to one of the adapters 130 with a universal joint 140.

Driveshaft 120 has a radially outer surface 122 extending between ends 120a, b. In this embodiment, outer surface 122 includes a pair of axially spaced apart raised annular bands 123, an annular recess 124 axially adjacent each band 123, and an annular recess 126 axially adjacent each band 123. Each band 123 is positioned proximal one end 120a, b, axially between one recess 124 and one recess 126.

For purposes of clarity and further explanation, adapter 130 disposed between rotor 50 and driveshaft 120 may also be referred to as the "upper" adapter 130, and adapter 130 disposed between the bearing assembly mandrel and driveshaft 120 may also be referred to as the "lower" adapter 130. In addition, universal joint 140 disposed between upper end 120a and upper adapter 130 may be referred to as "upper" universal joint 140, and universal joint 140 disposed between lower end 120b to lower adapter 130 may be referred to as "lower" universal joint 140.

Referring still to FIG. 4, each driveshaft adapter 130 extends along a central or longitudinal axis 135 between a first end 130a coupled to driveshaft 120, and a second end distal driveshaft 120. Specifically, first end 130a of upper adapter 130 is coupled to upper end 120a of driveshaft 120, and the second end of upper adapter 130 is coupled to the lower end of rotor 50. Further, first end 130b of lower adapter 130 is coupled to lower end 120b of driveshaft 120 and the second end of lower adapter 130 is coupled to the upper end of the bearing assembly mandrel. In this embodiment, ends 120a, b of driveshaft 120 are the same, and further, ends 130a of each driveshaft adapter 130 are the same.

Figure 5:
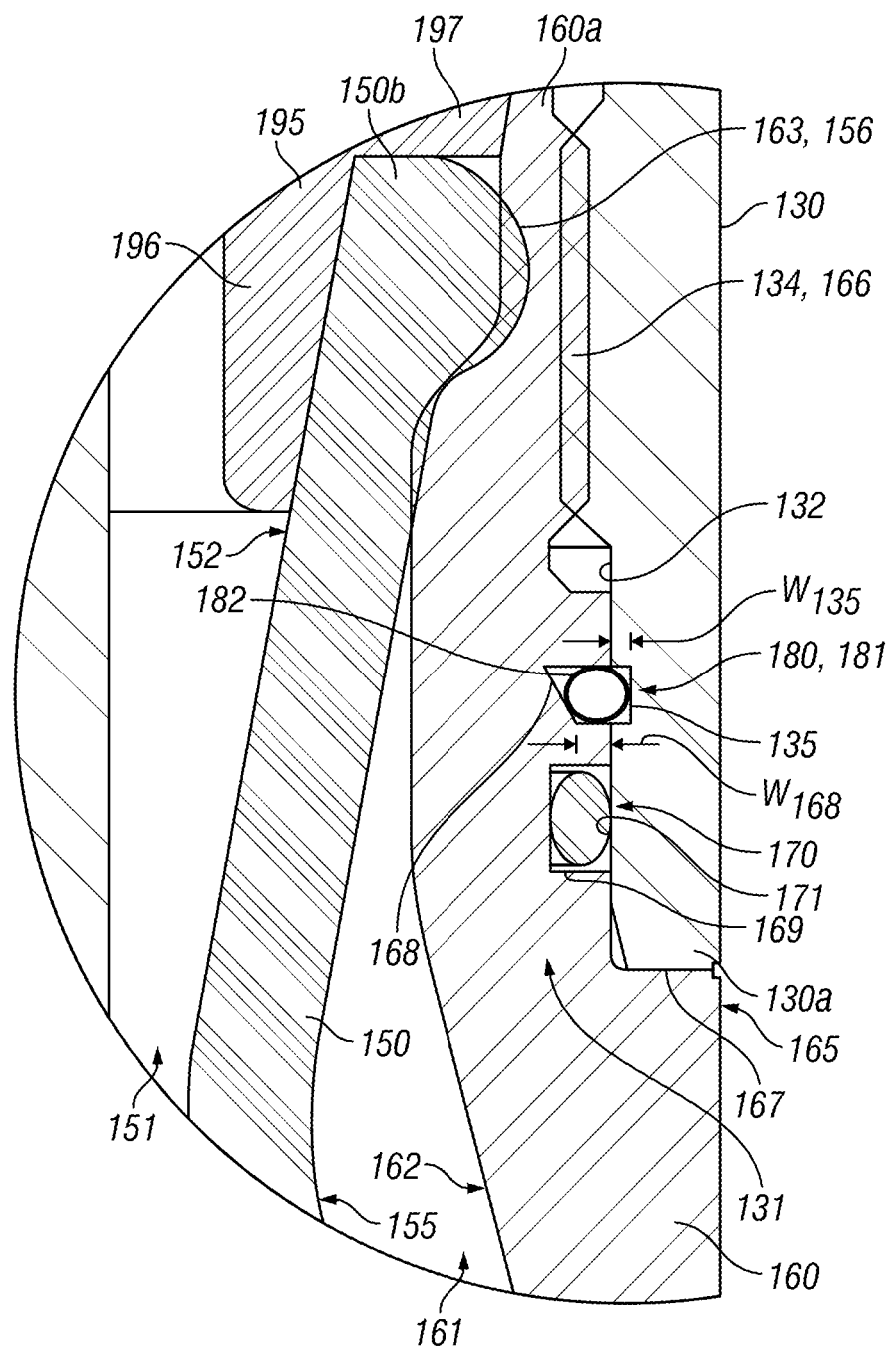
FIG. 5 is an enlarged partial cross-sectional view of the locking assembly as illustrated in section 5-5 of FIG. 4.

Referring to FIGS. 4 and 5, each adapter 130 includes a counterbore 131 extending axially (relative to axis 135) from end 130a. One end 120a, b and one universal joint 140 is disposed within each counterbore 131. In addition, each counterbore 131 defines a radially inner surface 132 including an annular shoulder 133 and internal threads 134 axially positioned between shoulder 133 and end 130a.

Universal joints 140 allow ends 120a, b to pivot within counterbores 131 relative to adapters 130. Specifically, upper universal joint 140 allows upper end 120a to pivot within counterbore 131 of upper adapter 130 about an upper pivot point 121a, and lower universal joint 140 allows lower end 120b to pivot within counterbore 131 of lower adapter 130 about a lower pivot point 121b. Upper adapter 130 is coaxially aligned with rotor 50 (i.e., axis 135 of upper adapter and rotor axis 58 are coaxially aligned), and lower adapter 130 is coaxially aligned with the bearing assembly mandrel and drill bit 90 (i.e., axis 135 of lower adapter 130, the central axis of the mandrel, and the central axis of drill bit 90 are coaxially aligned). Since rotor axis 58 is radially offset and/or oriented at an acute angle relative to the central axis of the mandrel, axis 125 of driveshaft 120 is typically skewed or oriented at an acute angle relative to axis 115 of housing 110, axis 58 of rotor 50, and the central axis of the mandrel. However, universal joints 140 accommodate for the angularly skewed driveshaft 120, while simultaneously permitting rotation of the driveshaft 120 within housing 110. In general, each universal joint (e.g., each universal joint 140) may comprise any joint or coupling that allows two parts that are coupled together and not coaxially aligned with each other (e.g., driveshaft 120 and adapter 130 oriented at an acute angle relative to each other) limited freedom of movement in any direction while transmitting rotary motion and torque including, without limitation, universal joints (Cardan joints, Hardy-Spicer joints, Hooke joints, etc.), constant velocity joints, or any other custom designed joint.

Referring again to FIG. 4, driveshaft assembly 100 also includes two seal boots 150 and two end caps 160—one seal boot 150 and one end cap 160 is provided for each universal joint 140. In general, seal boots 150 protect universal joints 140 from drilling mud flowing through annulus 51, and end caps 160 secure seal boots 150 in position and retain universal joint 140 and driveshaft ends 120a, b in counterbores 131. One seal boot 150 and end cap 160, also referred to as upper seal boot 150 and upper end cap 160, respectively, are disposed about driveshaft 120 proximal end 120a, and the other seal boot 150 and end cap 160, also referred to as lower seal boot 150 and lower end cap 160, respectively, are disposed about driveshaft 120 proximal end 120b.

In this embodiment, each end cap 160 is identical. In particular, each end cap 160 is a rigid, generally cylindrical member having a first end 160a coaxially disposed in counterbore 131 and a second end 160b extending from counterbore 131. In addition, each end cap 160 has a central through bore 161 extending between ends 160a, b; driveshaft 120 is disposed in through bore 161 of each end cap 160. As best shown in FIG. 5, each cap 160 has a radially inner surface 162 defined by through bore 161 and a radially outer surface 165, each surface 161, 165 extending between ends 160a, b. Inner surface 162 of each end cap 160 includes an annular recess or groove 163 proximal end 160a. Outer surface 165 of each end cap 160 includes external threads 166 proximal upper end 160a that engage mating internal threads 134 of adapter 130 and an annular shoulder 167 that axially abuts adapter end 130a.

Referring still to FIG. 5, a seal assembly 170 is radially disposed between each end cap 160 and its corresponding adapter 130. In general, seal assembly 170 restricts and/or prevents drilling fluid in annulus 51 from reaching universal joint 140 by flowing between its corresponding adapter 130 and end cap 160. In this embodiment, each seal assembly 170 comprises an annular seal gland or recess 169 formed in outer surface 165 of end cap 160 and an annular seal member 171 disposed in seal gland 169. Seal member 171 is radially disposed between and sealingly engages adapter 130 and end cap 160—the radially outer surface of seal member 171 forms a static seal with adapter inner surface 132, and the radially inner surface of seal member 171 forms a static seal with end cap outer surface 165. In this embodiment, seal member 171 is a radial seal (i.e., it is compressed radially between adapter 130 and end cap 160), and further, in this embodiment, seal member 171 is an O-ring seal. However, in general, seal member 171 may comprise any suitable sealing element.

A locking assembly 180 is also radially disposed between each end cap 160 and its corresponding adapter 130. Within each adapter 130, locking assembly 180 is axially disposed between seal assembly 170 and mating threads 134, 166. In general, locking assembly 180 restricts and/or prevents end cap 160 from moving axially relative to its corresponding adapter 130. In this embodiment, locking assembly 180 comprises a annular cavity 181 radially positioned between end cap 160 and its corresponding adapter 130 and an annular end cap retention member 182 disposed in cavity 181. Cavity 181 is formed by an annular recess 168 in end cap outer surface 165 and an annular recess 135 in adapter inner surface 132 that is radially opposed recess 168. In other words, recesses 135, 168 face each other and are disposed at the same axial position. As shown in FIG. 5, end cap recess 168 has a minimum radial width $W_{168}$ measured radially inward from end cap outer surface 165, and adapter recess 135 has a minimum radial width $W_{135}$ measured radially outward from adapter inner surface 132. In this embodiment, radial width $W_{135}$ is less than radial width $W_{168}$. In other embodiments, the radial width of the end cap recess (e.g., radial width $W_{168}$) is less than the radial width of the aligned adapter recess (e.g., radial width $W_{135}$).

As previously described, each end cap 160 threadingly engages its corresponding adapter 130. In particular, first end 160a of each end cap 160 is coaxially inserted into counterbore 131 and threadingly coupled to its corresponding adapter 130 via mating threads 134, 166. To form cavity 181, end cap 160 is preferably threaded and axially advanced through counterbore 131 until end cap recess 168 is radially opposed to adapter recess 135 as shown in FIG. 5. In this embodiment, end cap 160 and adapter 130 are sized and configured such end cap recess 168 and adapter recess 135 come together to form cavity 181 simultaneous with axial engagement of end cap shoulder 167 and adapter lower end 130a. In other words, the axial distance between shoulder 167 and recess 168 is the same as the axial distance between end 130a and recess 135. Thus, end cap 160 may be threaded into counterbore 131 until shoulder 167 engages adapter end 130a, at which point recesses 135, 168 will be aligned, thereby forming cavity 181.

Figure 6:
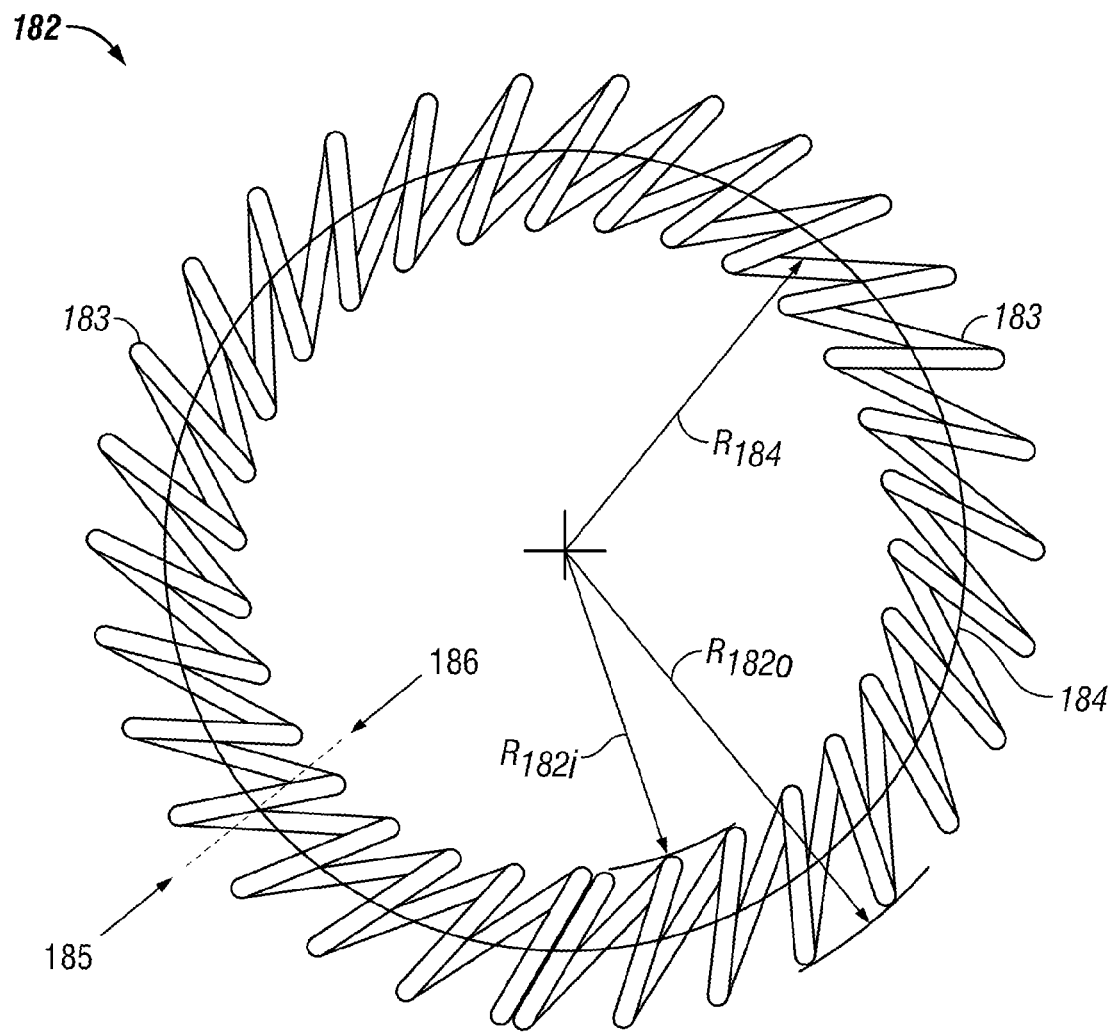
FIG. 6 is a top view of the retention member of FIGS. 4 and 5.

Referring now to FIGS. 5 and 6, retention member 182 is disposed in cavity 181 and extends radially into both recesses 135, 168. In this embodiment, the radially inner surface of retention member 182 engages end cap 160 and the radially outer surface of retention member 182 engages adapter 130. As best shown in FIG. 6, in this embodiment, each retention member 182 is an annular canted coil spring comprising a plurality of coils 183 canted along a circular center line 184 disposed at a radius $R_{184}$. Coils 183 are interconnected in a manner forming a circular spring having an outer radius $R_{182\text{-}o}$ that is greater than radius $R_{184}$ and an inner radius $R_{182i}$ that is less than radius $R_{184}$. In addition, coils 183 are interconnected in a manner having a primary load-deflection characteristic along a radial direction as indicted by arrows 185, 186. In FIG. 6, retention member 182 is shown in its undeformed state. However, upon application of radially compressive loads in the direction of arrow 185 and/or arrow 186, retention member 182 deforms and compresses radially inward. For example, when retention member 182 is seated in recess 168 and a radially compressive force in the direction of arrow 185 is applied, outer radius $R_{182o}$ decreases. An equal and opposite radial force is applied to retention member 182 in the direction of arrow 186, however, since retention member 182 is seated in recess 168, inner radius $R_{182i}$ remains substantially constant. Upon removal of radially compressive loads, retention member 182 resiliently transitions back to its original, undeformed state. Thus, retention member 182 may be described has having an undeformed state or position and a deformed state or position when radially compressive loads are applied to spring 182. Outer radius $R_{182o}$ of retention member 182 is greater in the undeformed state than in the deformed state, and inner radius $R_{182i}$ of retention member 182 is less in the undeformed state than in the deformed state. Other examples of other suitable canted coil springs that may be employed as end cap retention members (e.g., retention members 190) are described in U.S. Pat. Nos. 4,830,344, 4,974,821, and 5,139,276, each of which is hereby incorporated herein by reference in its entirety.

Referring again to FIGS. 4 and 5, each seal boot 150 has a first end 150a secured to annular recess 124 of driveshaft 120, a second end 150b secured to its corresponding end cap 160 within counterbore 131, and a central through bore or passage 151 extending axially between ends 150a, b. Driveshaft 120 extends through passage 151 of each seal boot 150. In addition, each seal boot 150 has a radially inner surface 152 defined by passage 151 and a radially outer surface 155, each surface 152, 155 extending between ends 150a, b. Inner surface 152 of each seal boot 150 includes an annular lip 153 at end 150a, and outer surface 155 of each seal boot 150 includes an annular lip 156 at end 150b. Lip 153 is seated in and sealingly engages annular recess 124 in driveshaft outer surface 122, and lip 156 is seated in and sealingly engages annular recess 163 in end cap inner surface 162.

As best shown in FIG. 4, lip 153 of each seal boot 150 is radially positioned between driveshaft 120 and an annular seal boot retainer ring 190. Each retainer ring 190 is disposed about driveshaft 120 and has a radially inner surface 191 that engages seal boot outer surface 155 and restricts and/or prevents lip 153 from moving radially outward and disengaging recess 124. A snap ring 192 disposed in driveshaft recess 126 restricts and/or prevents retainer ring 190 from disengaging seal boot outer surface 155.

As best shown in FIG. 5, lip 156 of each seal boot 150 is radially positioned between end cap 160 and an annular seal boot retainer ring 195. One retainer ring 195 is coaxially positioned within each counterbore 131 and disposed about driveshaft 120. In this embodiment, retainer ring 195 has an L-shaped cross-section including a base portion 196 extending axially along inner surface 152 of seal boot 150 at end 150b and a flange portion 197 extending radially from base portion 196 along seal boot 150 at end 150b. Base portion 196 engages seal boot inner surface 152 and restricts and/or prevents lip 156 from moving radially inward and disengaging recess 163, and flange portion 197 axially abuts end 150b and restricts and/or prevents lip 156 from moving axially within counterbore 131 toward universal joint 140.

Referring again to FIG. 4, an annular clearance gap 52 is provided between each end cap 160 and driveshaft 120 to allow driveshaft 120 to pivot relative to each adapter 130 and end cap 160, without interference. Seal boots 150 restrict and/or prevent drilling fluid flowing though annulus 51 of driveshaft assembly 100 from flowing through gap 52 to universal joints 140. In particular, one seal boot 150 is disposed between each universal joint 140 and adapter 130 and extends across annular clearance gap 52, thereby restricting and/or preventing drilling fluid from flowing through clearance gap 52 to universal joint 140. Accordingly, seal boots 150 protect universal joints 140 from being contaminated by drilling fluid, which, over time, may otherwise wear out or damage universal joints 140.

Since end 150a of each seal boot 150 is coupled to driveshaft 120, the other end 150b of each seal boot 150 is coupled to its corresponding adapter 130, respectively, and each adapter 130 is pivotally coupled to driveshaft 120, ends 150a, b of each seal boot may pivot or move relative to each other. Accordingly, seal boot 150 is preferably made of a flexible, durable material suitable for use in harsh downhole conditions such as an elastomeric material. In this embodiment, seal boot 150 has an undeformed axial length between ends 150a, b that is greater than the axial distance between recesses 124 and 163. This additional length or slack in each seal boot 150 accommodates pivoting of adapters 130 relative to driveshaft 120 without excessively stressing or stretching seal boots 150.

Referring now to FIGS. 4 and 5, in the discussion to follow, the assembly of driveshaft assembly 100 with respect to upper end 120a, upper adapter 130, and upper universal joint 140 will be explained with the understanding that the same procedures are applied to lower end 120a, lower adapter 130, and lower universal joint 140. In addition, the assembly procedures described below provide one exemplary approach to assembling driveshaft assembly 100. However, other suitable techniques for assembling driveshaft assembly 100 (e.g., other assembly techniques that vary the order of the assembly steps) may be employed.

In one exemplary embodiment for assembling driveshaft assembly 100, seal boot retainer ring 190 is positioned on driveshaft 120 between the pair of driveshaft recesses 126. In addition, retention member 182 is disposed about end cap 160 within recess 168, and seal member 171 is disposed about end cap 160 within recess 169. For example, retention member 182 and seal member 171 may be stretched over end cap end 160a and axially advanced along outer surface 165 until seated in recesses 168, 169, respectively.

Seal boot annular lip 156 is disposed in end cap annular recess 163, and base portion 196 of seal boot retainer ring 195 is coaxially inserted into seal boot passage 151 at end 150b until flange portion 197 engages end 150b of seal boot 150. Base portion 196 slidingly engages seal boot inner surface 152 and radially compresses lip 156 against end cap 160 as base portion 196 is axially advanced into passage 151. Next, end 120a of driveshaft 120 is axially inserted and advanced through the retainer ring 195, seal boot 150, and end cap 160 sub-assembly, and then driveshaft end 120a is axially inserted into counterbore 131 and pivotally coupled to adapter 130 with universal joint 140. For example, the components of universal joint 140 may be assembled onto end 120a of driveshaft 120, and together, these components may be inserted axially into counterbore 131.

With driveshaft end 120a and universal joint 140 sufficiently disposed in counterbore 131, end cap 160 is threaded into counterbore 131. In particular, retention member 182 is radially compressed into recess 168 as threads 134, 166 are threaded together. Up to this point, and until recesses 135, 168 are radially aligned and opposed one another to form cavity 181, retention member 182 is radially compressed within recess 168 between adapter 130 and end cap 160. End cap 160 is rotated relative to adapter 130 and urged axially into counterbore 131 to engage mating threads 134, 166. End cap 160 is threaded into counterbore 131 until end cap shoulder 167 abuts adapter end 130a, at which point recesses 135, 168 come into radial alignment and form cavity 181. Once cavity 181 is formed, retention member 182 is free to radially expand into adapter recess 135. During and after end cap 160 is threaded into counterbore 131, seal member 171 disposed in recess 169 engages end cap 160 and adapter 130. Since seal boot end 150b has not yet been secured to driveshaft 120 as end cap 160 is threaded into counterbore 131, seal boot 150, as well as retainer ring 195 coupled thereto, are free to rotate with end cap 160 relative to adapter 130 as end cap 160 is threaded into counterbore 131. Once secured within counterbore 131, end cap 160 also functions to retain universal joint 140 and driveshaft end 120a within counterbore 131.

With end cap 160 sufficiently threaded into counterbore 131, annular lip 152 at seal boot end 150a is disposed in driveshaft recess 124 and retainer ring 190 is slid axially along driveshaft 120 until it slidingly engages raised annular band 123 and seal boot outer surface 155, thereby radially compressing lip 152 against driveshaft 120. Retainer ring 190 is axially advanced until recess 126 is exposed, and then, a snap ring 192 is positioned in recess 126. Snap ring 192 extends radially outward from recess 126 and restricts and/or prevents retainer ring 190 from moving axially over recess 126 and disengaging seal boot outer surface 155.

With retainer ring 190 secured to driveshaft 120, lip 152 disposed in recess 124, and seal boot end 150a radially squeezed between retainer ring 190 and driveshaft 120, the axial position of seal boot end 150a along driveshaft 120 is secured and maintained. Further, with end cap 160 threadingly secured to adapter 130, lip 156 disposed in recess 163, and seal boot end 150b radially squeezed between retainer ring 195 and end cap 160, the axial position of seal boot end 150b within counterbore 131 is secured and maintained.

In some conventional driveshaft assemblies, vibrations and loads experienced downhole may cause the end cap to unthread from the adapter. If the end cap completely disengages the adapter, the ability of the seal boot to protect the universal joint from drilling mud flowing through the driveshaft assembly is substantially compromised. However, in the embodiment shown in FIG. 4, locking assembly 180 restricts and/or prevents relative axial movement between adapter 130 and end cap 160. In particular, retention member 182 spans radially across and engages both recesses 135, 168 forming cavity 181, and thus, restricts and/or prevents end cap 160 from moving axially relative to adapter 130. Even if downhole vibrations initiate unthreading of end cap 160 and adapter 130, retention member 182 interferes with relative axial movement between adapter 130 and end cap 160, thereby restricting and/or preventing further unthreading. Accordingly, embodiments described herein offer the potential for a more robust and secure connection of the end cap (e.g., end cap 160) to the driveshaft adapter (e.g., adapter 130), and thus, also offer the potential to reduce the likelihood of the end cap from unthreading and disengaging the driveshaft adapter during downhole operations. In addition, embodiments described herein offer the potential to eliminate the need for thread locking compound and excessive makeup torque, thereby alleviating servicing hazards and improving the serviceability of the driveshaft assembly (e.g., driveshaft assembly 100).

In general, once locking assembly 180 is formed, disengagement and separation of end cap 160 from adapter 130 can only occur if sufficient breakout torque is applied to end cap 160 to either, depending on the design and configuration of recesses 135 and 168, completely shear through retention member 182, or provide sufficient force to cause radial deflection of retention member 182, and allow end cap 160 to be fully unthreaded from adapter 130. Retention member 182 may be sized, configured, and made of materials such that the amount of breakout torque required to shear retention member 182 can be applied by a service technician using a pipe wrench and snipe for ease of disassembly, while maintaining adequate locking force to restrict and/or prevent axial movement between adapter 130 and end cap 160 while downhole.

As previously described, in the embodiment shown in FIG. 4, each end cap 160 has a first end 160a received by counterbore 131 of its corresponding adapter 130 and a second end 160b extending from counterbore 131. Thus, in this embodiment, adapter 130 may be described as a "box end" and end cap 160 may be described as a "pin end" that is received within counterbore 131 of adapter 130. However, embodiments of the locking assembly (e.g., locking assembly 180) may also be employed in driveshaft assemblies including a "box end" end cap disposed about a "pin end" adapter. In particular, the locking assembly may be radially positioned between the end cap and the adapter that is coaxially received by the end cap. For example, in FIG. 12, an embodiment of a locking assembly 180' is radially disposed between a end cap 160' configured as a box end and an adapter 130' configured as a pin end. End cap 160' includes a through bore 161' that receives the lower end 130a' of adapter 130'. End cap 160' has internal threads 166' that threadingly engage mating external threads 134' of adapter 130'. A seal assembly 170' is also radially positioned between end cap 160' and adapter 130'.

In general, locking assembly 180' restricts and/or prevents end cap 160' from moving axially relative to its corresponding adapter 130'. Locking assembly 180' is similar to locking assembly 180 previously described. Namely, locking assembly 180' comprises a annular cavity 181' radially positioned between end cap 160' and its corresponding adapter 130' and an annular end cap retention member 182' disposed in cavity 181'. Cavity 181' is formed by an annular recess 168' in end cap inner surface 165' and an annular recess 135' in adapter outer surface 132' that is radially opposed recess 168'. Retention member 182' extends radially into both recesses 135', 168'. In this embodiment, retention member 182' is an annular canted coiled spring configured the same as retention member 182 previously described.

Figure 12:
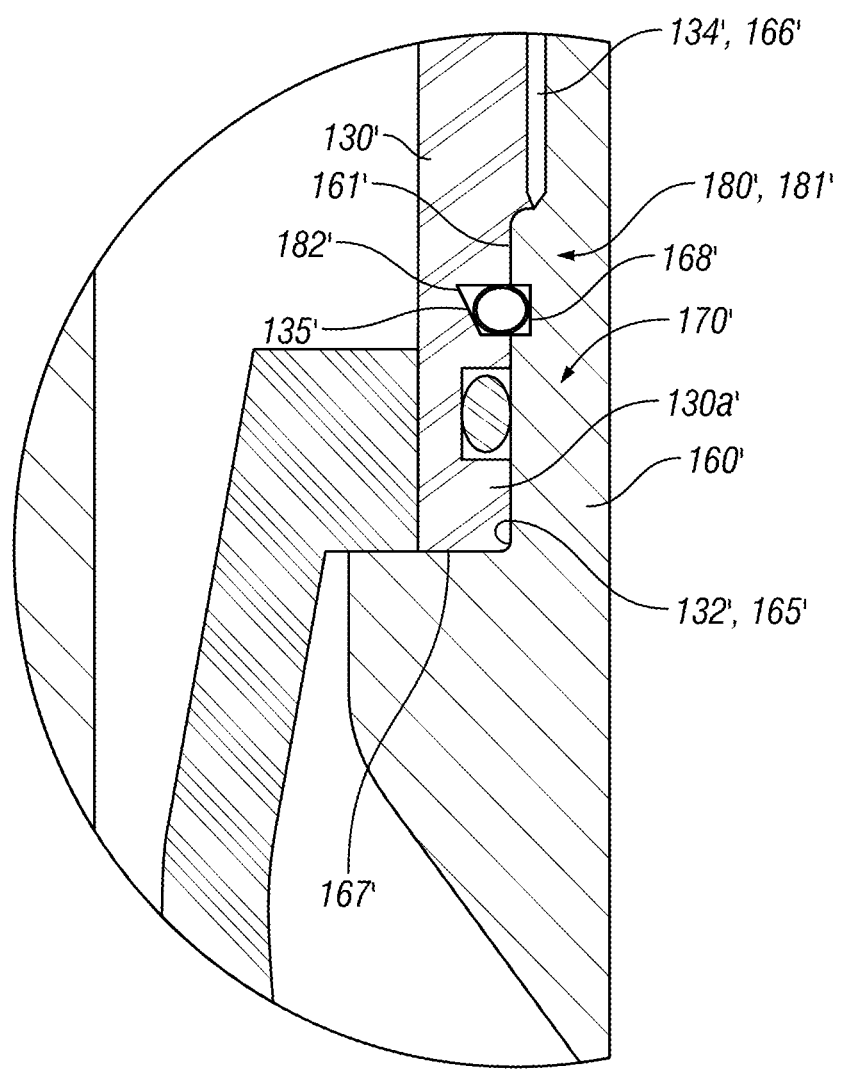
FIG. 12 is an enlarged partial cross-sectional view of an embodiment of a locking assembly positioned between a driveshaft adapter and an end cap.

Referring still to FIG. 12, end cap 160' threadingly engages its corresponding adapter 130'. In particular, end 130a' of adapter 130' is coaxially inserted into bore 161' and threadingly coupled to end cap 160' via mating threads 134', 166'. To form cavity 181', adapter 130' is preferably threaded and axially advanced through bore 161' until end cap recess 168' is radially opposed to adapter recess 135'. In this embodiment, end cap 160' and adapter 130' are sized and configured such end cap recess 168' and adapter recess 135' come together to form cavity 181' simultaneous with axial engagement of end cap shoulder 167' and adapter lower end 130a'.

Figure 7:
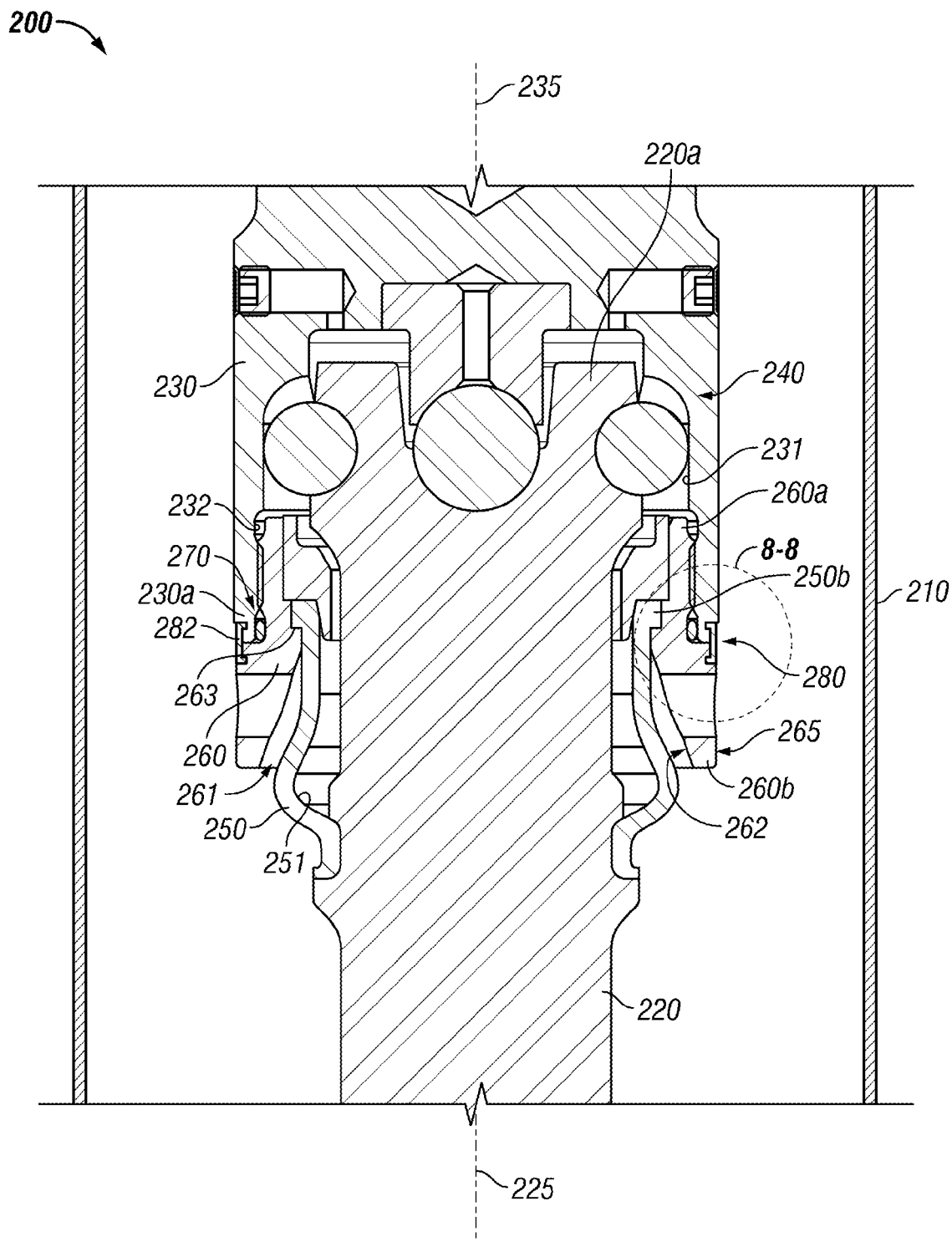
FIG. 7 is a partial cross-sectional view of an embodiment of a driveshaft assembly in accordance with the principles described herein.
Figure 8:
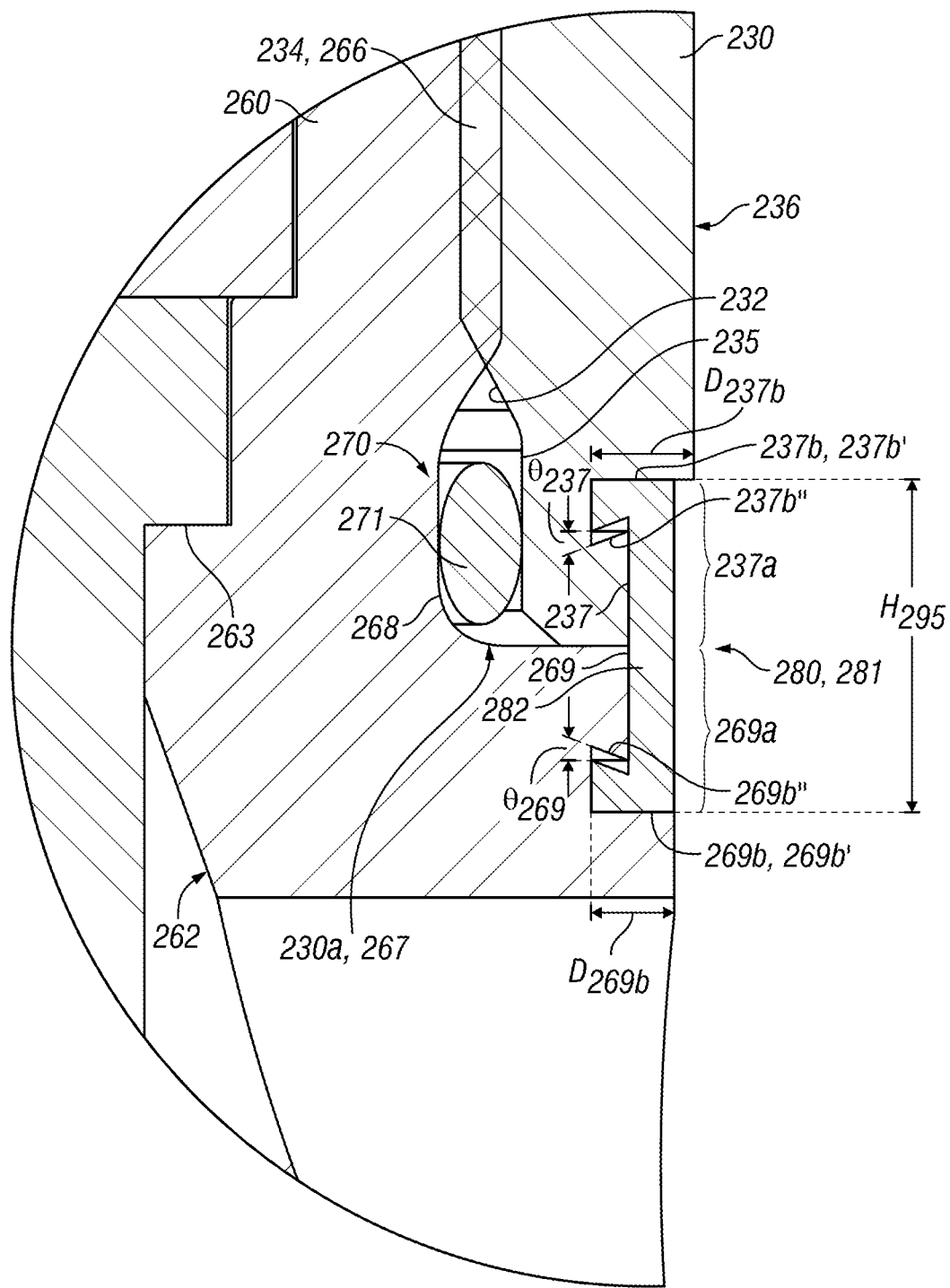
FIG. 8 is an enlarged partial cross-sectional view of the locking assembly illustrated in section 8-8 of FIG. 7.

Referring now to FIGS. 7 and 8, an embodiment of a driveshaft assembly 200 for transferring torque from an eccentrically-rotating rotor of a power section (e.g., rotor 50 of power section 40) to the concentrically-rotating mandrel of a bearing assembly (e.g., bearing assembly 80) and a drill bit (e.g., drill bit 90) is shown. For example, driveshaft assembly 200 may be used in place of driveshaft assembly 100 shown in FIG. 1.

Driveshaft assembly 200 is similar to driveshaft assembly 100 previously described. Namely, driveshaft assembly 200 includes an outer housing 210 extending between the stator housing (e.g., stator housing 65) and the bearing assembly housing (e.g., housing 81), a driveshaft 220 rotatably disposed within housing 210, and a pair of driveshaft adapters 230—one driveshaft adapter 230 connecting driveshaft 220 to the rotor of the power section (e.g., rotor 150) and the other driveshaft adapter 130 connecting driveshaft 220 to the mandrel. A universal joint 240 pivotally couples each end of driveshaft 220 to one driveshaft adapter 230. In FIG. 7, the upper portion of driveshaft assembly 200, which is connected to the lower end of the power section, is shown. However, it is to be understood that the lower portion of driveshaft assembly 200, which is connected to the bearing assembly, is similarly configured.

Driveshaft 220 has a central or longitudinal axis 225, an upper end 220a coupled to the lower end of the rotor (e.g., rotor 50) with driveshaft adapter 230, and a lower end coupled to the upper end of the bearing assembly mandrel with a driveshaft adapter. Each universal joint 240 allows a corresponding end of driveshaft 220 to pivot relative to a corresponding adapter 230. In general, universal joint 240 may comprise any joint or coupling that allows two parts that are coupled together and not coaxially aligned with each other (e.g., driveshaft 220 and adapter 230 oriented at an acute angle relative to each other) limited freedom of movement in any direction while transmitting rotary motion and torque including, without limitation, universal joints (Cardan joints, Hardy-Spicer joints, Hooke joints, etc.), constant velocity joints, or any other custom designed joint.

Driveshaft adapter 230 has a central or longitudinal axis 235 and a first end 230a coupled to driveshaft 220. Adapter 230 includes a counterbore 231 that extends axially from end 230a and receives driveshaft end 220a and universal joint 240. As best shown in FIG. 8, counterbore 231 defines a radially inner surface 232 including internal threads 234 and an annular recess 235 axially between threads 234 and end 230a. Driveshaft adapter 230 also has a radially outer surface 236 including an annular recess 237 extending axially from end 230a. In this embodiment, recess 237 has a generally L-shaped cross-section including a first portion 237a extending axially from end 230a and a second portion 237b distal end 230a and extending radially inward from first portion 237a. Second portion 237b has an axial height that generally increases moving radially inward from surface 236. In this embodiment, second portion 237b includes a radially extending annular planar surface 237b' distal end 230a and a radially extending annular frustoconical surface 237b" proximal end 230a. Surface 237b" is oriented at an acute angle $\theta_{237}$ relative to surface 237b" and further, surface 237b" diverges from surface 237b' moving radially inward along second portion 237b. Angle $\theta_{237}$ is preferably greater than 0° and less than 60°, and more preferably between 0° and 30°. In this embodiment, angle $\theta_{237}$ is 15°.

Referring now to FIGS. 7 and 8, driveshaft assembly 200 also includes a seal boot 250 to protect universal joint 240 and an end cap or sleeve 260 to securely couple seal boot 250 to adapter 230. End cap 260 has a first end 260a disposed in counterbore 230 and a second end 260b extending from counterbore 231. In addition, each end cap 260 has a central through bore or passage 261 extending axially between ends 260a, b, a radially inner surface 262 defined by passage 261, and a radially outer surface 265. Inner surface 262 includes an annular shoulder 263 that engages seal boot 250. Outer surface 265 includes external threads 266 proximal upper end 260a, an annular shoulder 267 axially disposed between ends 260a, b, an annular recess or groove 268 axially positioned between threads 266 and shoulder 267, and an annular recess 269 extending from shoulder 267. As best shown in FIG. 8, in this embodiment, recess 269 has a generally L-shaped cross-section including a first portion 269a extending axially from shoulder 267 and a second portion 269b distal shoulder 267 and extending radially inward from first portion 269a. Second portion 269b has an axial height that generally increases moving radially inward from surface 236. In this embodiment, second portion 269b includes a radially extending annular planar surface 269b' distal shoulder 267 and a radially extending annular frustoconical surface 269b" proximal shoulder 267. Surface 269b" is oriented at an acute angle $\theta_{269}$ relative to surface 269b', and further, surface 269b" diverges from surface 269b' moving radially inward along second portion 269b. Angle $\theta_{269}$ is preferably greater than 0° and less than 60°, and more preferably between 0° and 30°. In this embodiment, angle $\theta_{269}$ is 15°.

Referring still to FIG. 8, each end cap 260 is attached to and coaxially aligned with adapter 230. Specifically, first end 260a of end cap 260 is coaxially disposed within counterbore 231 and threadingly coupled to adapter 230 via mating threads 234, 266. Each end cap 260 is preferably threaded and axially advanced through counterbore 231 until shoulder 267 axially abuts end 230a, at which point recesses 237, 269 come axially together.

Unlike driveshaft assembly 100 previously described, in this embodiment, a locking assembly (e.g., locking assembly 180) is not radially positioned between the end cap (e.g., end cap 260) and the adapter (e.g., adapter 130). Rather, in this embodiment, a locking assembly 280 to restrict and/or prevent relative axial movement between adapter 230 and end cap 260 is provided along outer surfaces 236, 265. In this embodiment, locking assembly 280 comprises an annular recess 281 along outer surfaces 236, 265 and an annular end cap retention member 282 disposed in recess 281. Together, annular recesses 237, 269 in outer surfaces 236, 265, respectively, form and define recess 281—as end cap 260 is threaded into adapter 230, recesses 237, 269 come axially together to form the single continuous recess 281 spanning the joint formed between end cap 260 and adapter 230. Locking assembly recess 281 may generally be described as having a C-shaped or U-shaped cross-section.

Figure 9:
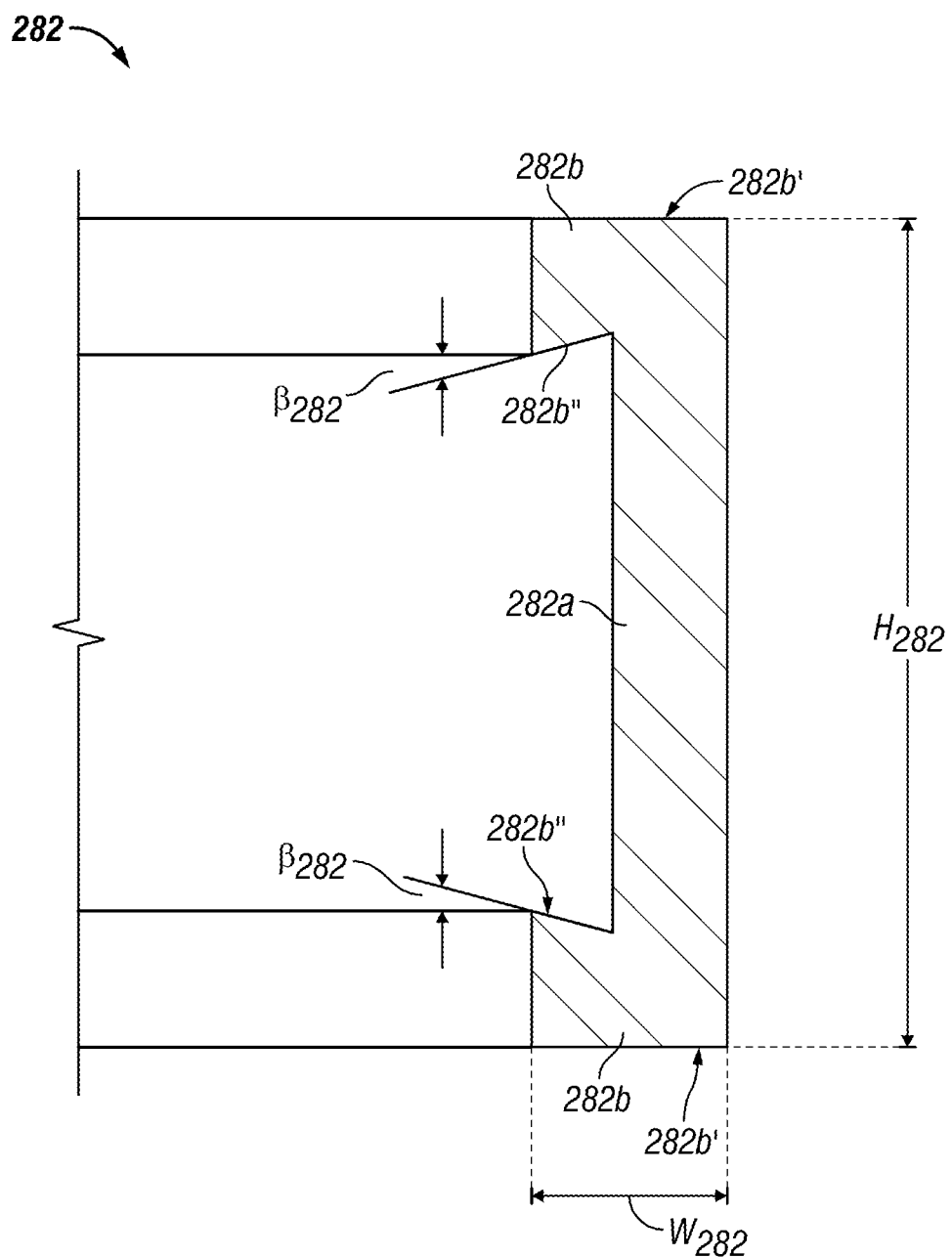
FIG. 9 is an enlarged partial cross-sectional view of the retention member of FIGS. 7 and 8.

As best shown in FIGS. 8 and 9, retention member 282 has a generally C-shaped or U-shaped cross-section that matingly engages recess 281. Specifically retention member 282 includes a cylindrical base portion 282a and a flange portion 282b extending radially inward from each end of base portion 282a. Base portion 282a is disposed in recess first portions 237a, 269a, and each flange portion 282b extends radially into recess second portions 237b, 269b.

Retention member 282 is sized and configured to fit within recess 281. For example, in this embodiment, retention member 282 has an axial height $H_{282}$ measured between flange portions 282b that is the same as the axial height $H_{281}$ of recess 281 (i.e., the sum of the axial length of first portion 237a and first portion 269a), and each flange portion 282b has a radial length $W_{282b}$ that is the same as the radial depth $D_{296b}$ of second portion 269b and slightly less than the radial depth $D_{237b}$ of second portion 237b. In addition, flange portions 282b are sized and configured similar to recesses 237b, 269b. Specifically, each flange portion 282b includes an annular planar surface 282b' distal base portion 282a and an annular frustoconical surface 282b" proximal base portion 282a. Surface 282b" diverges from surface 282b' moving radially inward from base portion 282a. For each flange portion 282, surface 282b" is oriented at an acute angle $\beta_{282}$ relative to surface 282b'. Angle $\beta_{282}$ is preferably greater than 0° and less than 60°, and more preferably between 0° and 30°. In addition, angle $\beta_{282}$ of each flange 282b is preferably the same as its mating recess surface 237b", 269b". Thus, in this embodiment, each angle $\beta_{282}$ is 15°.

Referring still to FIGS. 8 and 9, mating frustoconical surfaces 237b", 282b" and 269b", 282b" positively engage as end cap 260 begins to move axially relative to adapter 230. Specifically, due to the angular geometry of these mating surfaces as shown in FIG. 8, when end gap 260 begins to move axially relative to adapter 230, surfaces 237b", 269b" begin to exert radially inward forces on surfaces 282b", thereby tending to maintain retention member 282 in recess 281.

In this embodiment, retention member 282 is an annular snap-ring that is expanded and disposed about adapter 230 and end cap 260 in recess 281 after end cap 260 is threaded into adapter 230 and recess 281 is formed as end 230a and shoulder 267 axially abut one another. Once retention member 282 is disposed in recess 281, it restricts and/or prevents relative axial movement between end cap 260 and adapter 230. Subsequent separation of end cap 260 from adapter 230 can only occur if retention member 282 is removed from recess 281. The shape, size, and material of snap ring 282 are preferably selected such that a technician can expand and remove snap ring 282 with conventional snap ring pliers or by hand.

Referring again to FIGS. 7 and 8, a seal assembly 270 is radially disposed between end cap 260 and its corresponding adapter 230. In general, seal assembly 270 restricts and/or prevents drilling fluid disposed between driveshaft 220 and housing 210 from reaching universal joint 240 by flowing between adapter 230 and end cap 260. In this embodiment, seal assembly 270 comprises an annular seal member 271 disposed in radially opposed recesses 235, 268. Seal member 271 is radially disposed between and sealingly engages adapter 230 and end cap 260—the radially outer surface of seal member 271 forms a static seal with adapter inner surface 232, and the radially inner surface of seal member 271 forms a static seal with end cap outer surface 265. In this embodiment, seal member 271 is a radial seal (i.e., it is compressed radially between adapter 230 and end cap 260), and further, in this embodiment, seal member 271 is an O-ring seal. However, in general, seal member 271 may comprise any suitable sealing element.

Referring now to FIG. 7, seal boot 250 is similar to seal boot 150 previously described. Namely, seal boot 250 has a first end 250a secured to driveshaft 220, a second end 250b disposed within counterbore 231 and coupled to end cap 260, and a central through passage 251 extending axially between ends 250a, b. Driveshaft 220 extends through passage 251 of each seal boot 250. Seal boot 250 restricts and/or prevents drilling fluid flowing though the annulus between driveshaft 220 and housing 210 from reaching universal joint 240, thereby protecting universal joint 240 from being contaminated with drilling fluid, which over time, may otherwise wear out or damage universal joint 240. Since end 250a of each seal boot 250 is coupled to driveshaft 220, the other end 250b of each seal boot 250 is coupled to adapter 230, respectively, and each adapter 230 is pivotally coupled to driveshaft 220, ends 250a, b of seal boot 250 may pivot or move relative to each other. Accordingly, seal boot 250 is preferably made of a flexible, durable material suitable for use in harsh downhole conditions such as an elastomeric material. In this embodiment, seal boot 250 has an undeformed axial length between ends 250a, b that is greater than the deformed length of seal boot 250 once coupled to driveshaft 220 and adapter 230 as shown in FIG. 7. This additional length or slack in each seal boot 250 accommodates pivoting of adapters 230 relative to driveshaft 220 without excessively stressing or stretching seal boot 250.

Figure 10:
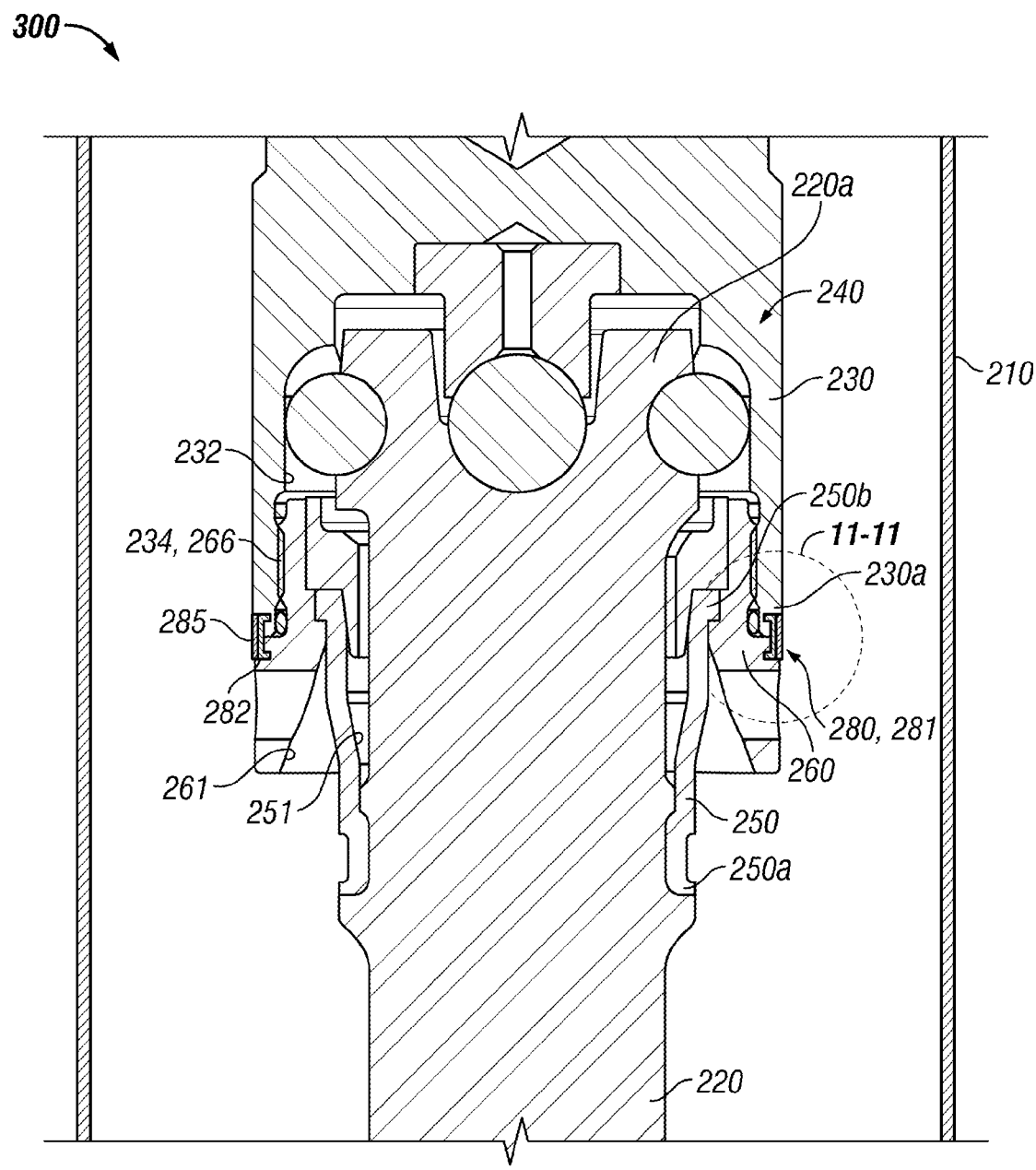
FIG. 10 is a partial cross-sectional view of an embodiment of a driveshaft assembly in accordance with the principles described herein.
Figure 11:
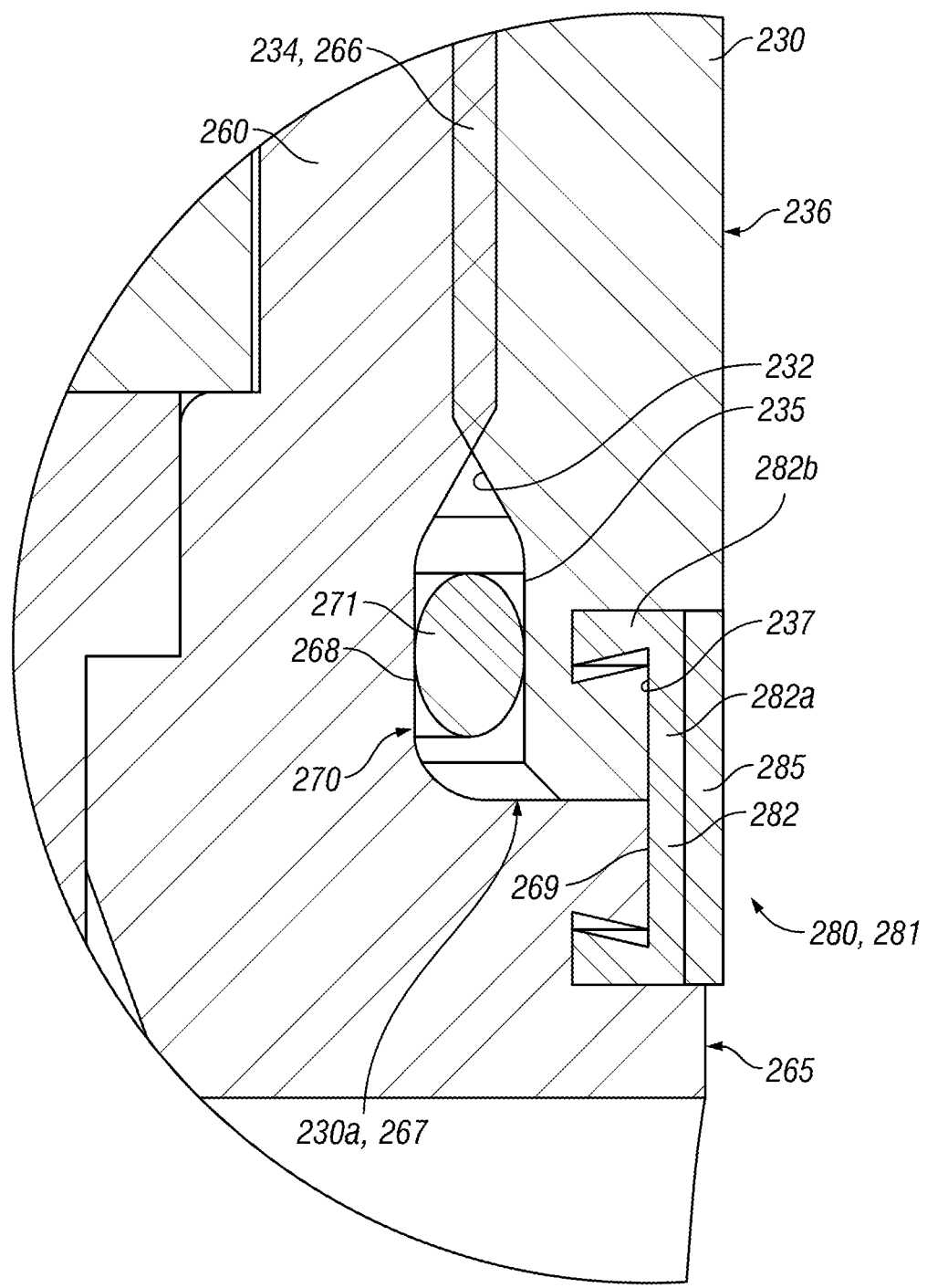
FIG. 11 is an enlarged partial cross-sectional view of the locking assembly as illustrated in section 11-11 of FIG. 10.

Referring now to FIGS. 10 and 11, an embodiment of a driveshaft assembly 300 for transferring torque from an eccentrically-rotating rotor of a power section (e.g., rotor 50 of power section 40) to the concentrically-rotating mandrel of a bearing assembly (e.g., bearing assembly 80) and a drill bit (e.g., drill bit 90) is shown. Thus, for example, driveshaft assembly 300 may be used in place of driveshaft assembly 100 shown in FIG. 1.

Driveshaft assembly 300 is substantially the same as driveshaft assembly 200 previously described. However, in this embodiment, retention member 282 is a split ring held in position by a generally cylindrical flat-band snap ring 285. Split ring 282 is placed in recess 281 after end cap 260 is threaded into adapter 230, and then snap ring 285 is expanded and disposed about retention member 282 within recess 281, thereby maintaining split ring 282 in place within recess 281. Once split ring 282 is disposed in recess 281, it restricts and/or prevents relative axial movement between end cap 260 and adapter 230. Subsequent separation of end cap 260 from adapter 230 can only occur if snap ring 285 is expanded and removed from recess 281, and then split ring 282 is pulled from recess 281. The shape, size, and material of snap ring 285 are preferably selected such that a technician can expand and remove snap ring 285 with conventional snap ring pliers or by hand.

As previously described, in the embodiments shown in FIGS. 7 and 9, retention member 282 restricts and/or prevents relative axial movement between adapter 230 and end cap 260. In particular, retention member 282 disposed in recess 281 axially spans across the joint between adapter 230 and end cap 260, and positively engages both adapter 230 and end cap 260, thereby restricting and/or preventing end cap 260 from moving axially relative to adapter 230. Thus, even if downhole vibrations initiate unthreading of end cap 260 and adapter 230, retention member 282 restricts and/or prevents further unthreading by restricting and/or preventing axial movement of end cap 260 relative to adapter 230. Accordingly, embodiments described herein offer the potential for a more robust and secure connection of the end cap (e.g., end cap 260) to the driveshaft adapter (e.g., adapter 230), and thus, also offer the potential to reduce the likelihood of the end cap from unthreading and disengaging the driveshaft adapter during downhole operations. In addition, embodiments described herein offer the potential to eliminate the need for thread locking compound and excessive makeup torque, thereby alleviating servicing hazards and improving the serviceability of the driveshaft assembly (e.g., driveshaft assembly 200, 300).

In the embodiments shown in FIGS. 7 and 10, locking assembly 280 is provided along outer surfaces 236, 265 of adapter 230 and end cap 260, respectively, and retention member 282 is disposed about adapter 230 and end cap 260 within mating recess 281. However, in other embodiments, the locking assembly (e.g., locking assembly 280) may positioned along the inner surfaces of the adapter and the end cap.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A driveshaft assembly for a downhole motor, comprising:
    a housing;
    a driveshaft rotatably disposed within the housing, the driveshaft having a central axis, a first end, and a second end;
    a driveshaft adapter having a first end coupled to the first end of the driveshaft with a universal joint, wherein the first end of the driveshaft adapter includes a counterbore, and wherein the first end of the driveshaft and the universal joint are disposed in the counterbore;
    an end cap disposed about the driveshaft and coaxially coupled to the driveshaft adapter by threaded engagement of an internal thread disposed on an inner surface of the driveshaft adapter and an external thread on an outer surface of the end cap;
    an annular gap radially positioned between the driveshaft and the end cap;
    a seal boot disposed about the driveshaft and adapted to restrict fluid flow through the annular gap, wherein the seal boot has a first end secured to the driveshaft and a second end secured to the end cap; and
    a locking assembly radially positioned between the end cap and the driveshaft adapter and including a retention member that engages the end cap and the driveshaft adapter, wherein the retention member is axially spaced from the engaged internal and external threads, and wherein the retention member is configured to restrict the end cap from moving axially relative to the driveshaft adapter.

2. The driveshaft assembly of claim 1, wherein the locking assembly is radially disposed between the end cap and the driveshaft adapter.

3. The driveshaft assembly of claim 2, wherein the locking assembly further comprises an annular cavity radially positioned between the end cap and the driveshaft adapter, and wherein the retention member is disposed in the annular cavity.

4. The driveshaft assembly of claim 3, wherein the end cap has a first end coaxially received by the counterbore of the driveshaft adapter.

5. The driveshaft assembly of claim 4, wherein the annular cavity comprises a first annular recess in a radially outer surface of the end cap and a second annular recess in a radially inner surface of the driveshaft adapter that is radially opposed the first annular recess.

6. The driveshaft assembly of claim 5, wherein the retention member extends radially from the first annular recess to the second annular recess.

7. The driveshaft assembly of claim 6, wherein the retention member is a canted-coil spring.

8. The driveshaft assembly of claim 4, wherein the radially outer surface of the end cap includes an annular shoulder that axially abuts the first end of the driveshaft adapter, and wherein the locking assembly is axially positioned between the annular shoulder and the first end of the end cap.

9. The driveshaft assembly of claim 3, wherein the adapter is coaxially received by the end cap.

10. The driveshaft assembly of claim 1, wherein the end cap has a radially outer surface including an annular shoulder that axially abuts the first end of the adapter, and wherein the locking assembly is positioned along a radially outer surface of the adapter and the radially outer surface of the end cap.

11. The driveshaft assembly of claim 10, wherein the locking assembly comprises an annular recess extending axially along the radially outer surface of the adapter and the radially outer surface of the end cap, and wherein the retention member is disposed in the annular recess.

12. The driveshaft assembly of claim 11, wherein the annular recess of the locking assembly has a C-shaped cross-section and the retention member has a C-shaped cross-section that mates with the annular recess.

13. The driveshaft assembly of claim 11, wherein the annular recess comprises a first portion extending axially between a first end disposed in the outer surface of the adapter and a second end in the outer surface of the end cap, a second portion extending radially inward from the first end of the first portion, and a third portion extending radially inward from the second end of the first portion;
   wherein the retention member includes a cylindrical base portion and a flange portion extending radially from each end of the base portion, wherein the base portion is disposed in the first portion of the annular recess, one flange portion extends radially into the second portion of the annular recess, and the other flange portion extends radially into the third portion of the annular recess.

14. The driveshaft assembly of claim 11, wherein the retention member is a snap ring that engages the outer surface of the end cap and the outer surface of the adapter and extends axially across the intersection of the annular shoulder of the end cap and the first end of the adapter.

15. The driveshaft assembly of claim 11, wherein the retention member is a split ring that engages the outer surface of the end cap and the outer surface of the adapter and extends axially across the intersection of the annular shoulder of the end cap and the first end of the adapter, and wherein the locking assembly further comprises a cylindrical snap ring disposed about the split ring, the snap ring adapted to maintain the position of the split ring within the annular recess.

16. A method for assembling a driveshaft assembly for a downhole motor, comprising:
   (a) pivotally coupling an end of a driveshaft to a driveshaft adapter with a universal joint, wherein the driveshaft adapter has a first end including a counterbore, and wherein the end of the driveshaft and the universal joint are disposed in the counterbore;
   (b) disposing an end cap about the driveshaft and coupling the end cap to the driveshaft adapter by threadably engaging an internal thread disposed on an inner surface of the driveshaft adapter and an external threaded on an outer surface of the end cap;
   (c) securing a first end of a seal boot to a first end of the end cap;
   (d) securing a second end of the seal boot to the driveshaft; and
   (e) restricting the end cap from moving axially relative to the driveshaft adapter with a locking assembly by positioning an end cap retention member at least partially in a first recess formed in the outer surface of the end cap and at least partially in a second recess formed in the inner surface of the driveshaft adapter, wherein the end cap retention member is axially spaced apart from the engaged internal and external threads.

17. The method of claim 16, wherein (b) comprises threading the end cap into the counterbore until an annular shoulder on the radially outer surface of the end cap axially abuts the first end of the driveshaft adapter.

18. The method of claim 16, wherein the first recess is a recess formed in the radially outer surface of the end cap, and wherein the second recess is a recess formed in the radially inner surface of the driveshaft adapter, wherein the first recess is radially aligned with the second recess after (b); and wherein the retention member extends radially into the first recess and the second recess.

19. The method of claim 18, wherein the retention member is a canted-coil spring, and wherein (e) further comprises radially expanding the spring into the second recess when the first recess is radially aligned with the second recess.

20. The method of claim 18, wherein the retention member is radially disposed between the end cap and the driveshaft adapter during (b).

21. The method of claim 20, wherein the retention member is disposed in the first recess during (b).

22. A downhole motor, comprising:
   a power section including a stator and a rotor rotatably disposed in the stator;
   a driveshaft assembly including a housing and a driveshaft rotatably disposed in the housing, wherein the housing has an upper end coupled to the stator and the driveshaft is pivotally coupled to the rotor with a driveshaft adapter and a universal joint, and wherein a first end of the driveshaft and the universal joint are disposed in a counterbore formed in an end of the driveshaft adapter;
   wherein the driveshaft assembly further comprises an end cap disposed about the driveshaft, the end cap having a first end coaxially coupled to the driveshaft adapter by threaded engagement of an internal thread disposed on an inner surface of the driveshaft adapter and an external thread on an outer surface of the end cap;
   a locking assembly adapted to restrict the end cap from moving axially relative to the driveshaft adapter, wherein the locking assembly includes a first recess formed in a surface of the end cap, a second recess formed in a surface of the driveshaft adapter, and a retention member at least partially disposed in the first recess in the outer surface of the end cap and at least partially disposed in the second recess in the inner surface of the driveshaft adapter, and wherein the retention member is axially spaced from the engaged internal and external threads.

23. The downhole motor of claim 22, wherein the first recess is disposed in a radially outer surface of the end cap and wherein the second recess is disposed in a radially inner surface of the driveshaft adapter radially adjacent the radially outer surface of the end cap.

24. The downhole motor of claim 23, wherein the retention member is a spring that extends radially into the first recess and the second recess.

25. The downhole motor of claim 24, wherein the first recess has a radial width W1 measured radially inward from the radially outer surface of the end cap, and wherein the second recess has a radial width W2 measured radially outward from the radially inner surface of the driveshaft adapter, and wherein width W1 is greater than width W2.

* * * * *